US009742848B2

(12) United States Patent
Baskar et al.

(10) Patent No.: US 9,742,848 B2
(45) Date of Patent: Aug. 22, 2017

(54) METHOD AND SYSTEM FOR TRANSMITTING PAGING MESSAGES TO MACHINE TYPE COMMUNICATION (MTC) DEVICES IN WIRELESS COMMUNICATION

(71) Applicant: Samsung Electronics Co., Ltd, Gyeonggi-do (KR)

(72) Inventors: Umasankar Ceendhralu Baskar, Bangalore (IN); Diwakar Sharma, Bangalore (IN); Vijay Shankar Khairmode, Bangalore (IN)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 111 days.

(21) Appl. No.: 14/684,173

(22) Filed: Apr. 10, 2015

(65) Prior Publication Data

US 2015/0296482 A1 Oct. 15, 2015

(30) Foreign Application Priority Data

Apr. 10, 2014 (IN) ............................ 1895/CHE/2014

(51) Int. Cl.
*H04H 20/71* (2008.01)
*H04L 29/08* (2006.01)
(Continued)

(52) U.S. Cl.
CPC ............ *H04L 67/12* (2013.01); *H04L 12/189* (2013.01); *H04L 12/1886* (2013.01);
(Continued)

(58) Field of Classification Search
USPC .......... 370/230–294, 311–338; 455/454–509
See application file for complete search history.

(56) References Cited

U.S. PATENT DOCUMENTS 7,894,371 B2 * 2/2011 Bonta .................. H04W 74/02
370/254
8,340,029 B2 * 12/2012 Chion .................. H04W 72/04
370/312
(Continued)

FOREIGN PATENT DOCUMENTS

EP 2553991 A1 2/2013
WO WO 2013102386 A1 7/2013

*Primary Examiner* — Man Phan

(57) ABSTRACT

A method to transmit paging messages to Machine Type Communication (MTC) devices in wireless communication is provided. The method includes establishing, by a first cluster head, a dedicated radio connection with at least one base station. The method also includes receiving a request from a plurality of MTC devices to transmit a signaling message. The signaling message includes a tracking area update (TAU) and paging information associated with the plurality of MTC devices. The method further includes storing information of the plurality of MTC devices associated with the first cluster head and base station corresponding to each of the MTC devices. The method includes fetching, by a Mobility Management Entity (MME), information of the base station associated with a serving MTC device based on receiving a data request from the at least one MTC device and transmitting the paging information to the base station associated with the serving MTC device.

20 Claims, 14 Drawing Sheets

(51) Int. Cl.
 *H04W 4/00* (2009.01)
 *H04L 12/18* (2006.01)
 *H04W 68/04* (2009.01)
 *H04W 60/04* (2009.01)
(52) U.S. Cl.
 CPC .......... *H04W 4/005* (2013.01); *H04W 68/04* (2013.01); *H04W 60/04* (2013.01)

(56) References Cited

U.S. PATENT DOCUMENTS

| | | | |
|---|---|---|---|
| 8,891,423 B2* | 11/2014 | Shaheen | H04W 4/005 370/311 |
| 8,971,270 B2* | 3/2015 | Bachmann | H04W 4/00 370/329 |
| 9,014,117 B2* | 4/2015 | Chion | H04W 72/04 370/312 |
| 2013/0015953 A1 | 1/2013 | Hsu et al. | |
| 2013/0136072 A1 | 5/2013 | Bachmann et al. | |
| 2014/0092833 A1* | 4/2014 | Vannithamby | H04W 52/0258 370/329 |
| 2014/0233515 A1* | 8/2014 | Chen | H04W 4/005 370/329 |
| 2014/0376426 A1* | 12/2014 | Boudreau | H04L 47/41 370/294 |
| 2015/0023244 A1* | 1/2015 | Shaheen | H04W 4/005 370/312 |
| 2015/0289080 A1* | 10/2015 | Wu | H04W 76/02 370/329 |
| 2016/0142860 A1* | 5/2016 | Kim | H04W 60/00 455/435.1 |
| 2016/0174205 A1* | 6/2016 | Maaref | H04W 4/005 370/329 |

* cited by examiner

METHOD AND SYSTEM FOR TRANSMITTING PAGING MESSAGES TO MACHINE TYPE COMMUNICATION (MTC) DEVICES IN WIRELESS COMMUNICATION

CROSS-REFERENCE TO RELATED APPLICATION AND CLAIM OF PRIORITY

The present application is related to and claims benefit under 35 U.S.C. §119(a) to Indian Application Serial No. 1895/CHE/2014, which was filed in the Indian Intellectual Property Office on Apr. 10, 2014, the entire content of which is hereby incorporated by reference.

TECHNICAL FIELD

The present disclosure relates to the field of machine type communications (MTC), and more particularly relates to a method and system for transmitting paging messages to the serving base station associated with the MTC device.

BACKGROUND

Machine-to Machine (M2M)/Machine Type Communications (MTC) applications are applications where machines communicate with each other directly without human intervention. Examples of applications include smart metering, safety applications, health monitoring, fleet management, data applications and remote applications.

The MTC devices can be embedded in cars, consumer electronic devices, vending devices and the like. These devices are large in number and are wide spread. The applications should communicate through widely deployed networks connecting the MTC devices to Internet forming Internet of Things (IoT). While some existing MTC deployments use short range communications, it would be ideal to use cellular networks as the cellular network infrastructure is established in a stable manner and can support a large number of MTC devices.

The MTC servers which are generating traffic and trying to connect to several MTC devices at the same time leads to overload at backhaul traffic in Radio access network (RAN) and Core Network (CN). This causes intolerable paging delay, paging miss due to resource unavailability and spectrum inefficiency. At the MTC device, receiving the unnecessary paging such as paging for other users and processing the same will reduce the battery drain. Similarly overload occurs at the network side when the MTC servers initiate concurrent data transmission to several MTC devices. As the MTC servers are connected to the core network (MME/S-GW) and the core network is connected to the eNodeB or base station, the MTC servers attempts to reach the MTC devices to establish the connection and to send the data using the common channels (Paging channel). Since resources are limited in the common channel (Paging channel), eNodeB may not accommodate all the received paging messages in a given Paging Occasion, which in turn leads to paging delay or paging miss at the UE side. Similarly at the core network side, sending the paging to all the eNodeB irrespective of UE belongs to which eNodeB will cause overload at backhaul traffic.

The foregoing examples of the related art and limitations related therewith are intended to be illustrative and not exclusive. Other limitations of the related art will become apparent upon a reading of the specification and a study of the drawings.

SUMMARY

To address the above-discussed deficiencies, it is a primary object to provide a method and system for transmitting paging messages to Machine Type Communication (MTC) devices in wireless communication system.

In a first example, a method to transmit paging message to Machine Type Communication (MTC) devices in a wireless communication system is provided. The method includes establishing, by a first cluster head, a dedicated radio connection with at least one base station. The method also includes receiving a request from a plurality of MTC devices for transmission of a signaling message. The signaling message includes a tracking area update (TAU) and a paging information associated with the plurality of MTC device. The method further includes storing information of the plurality of MTC devices associated with the first cluster head and base station corresponding to each of the MTC device. The method includes fetching, by a Mobility Management Entity (MME) information of the base station associated with a serving MTC device on receiving a data request from the at least one MTC device. The method also includes transmitting the paging information to the base station associated with the serving MTC device. The method further includes multicasting the paging information to the plurality of MTC devices in a first cluster and obtaining paging response from the plurality of MTC devices. The cluster head establishes and releases the dedicated connection with the base station based on a signaling pattern of the plurality of MTC devices.

In an embodiment, the method includes listing, by at least one MTC device, the plurality of MTC devices in the proximity if one or more clusters have a dedicated connection with the base station. The method also includes selecting a second cluster head having a dedicated connection with a base station for transmitting the signaling messages from the plurality of MTC devices if a first cluster does not have a dedicated connection with the first cluster head. The method further includes establishing a connection with the second cluster head. The method includes transmitting, by the second cluster head, information on a secondary cluster data signaling message to the MME. The method also includes updating the database for primary MTC devices and secondary MTC devices. The primary MTC devices are associated with the registered cluster head and the secondary MTC devices are temporarily connected to the secondary cluster head. The method further includes deleting information on the plurality of secondary MTC devices from the cluster database when the primary cluster head establish a dedicated connection with the base station. The plurality of MTC devices is one of a second cluster head or a plurality of MTC devices associated with the second cluster head.

In an embodiment, the secondary cluster data includes information of a secondary MTC device. The secondary MTC device is one of a Cluster Head or a Cluster Member that does not have a dedicated connection with the base station and has a second MTC device that has a dedicated connection to the base station. In an embodiment, establishing a connection with the second cluster head by the MTC device includes requesting for a serving signal strength (CINR/RSRQ) to the second cluster head with respect to a serving base station associated with the second cluster head, selecting the cluster head in the proximity having a high signal strength with respect to the serving base station, and establishing a direct connection with the second cluster head.

In an embodiment, establishing a connection with the second cluster head by the MTC device also includes requesting for a serving signal strength to the second cluster head by one of an MTC device associated with the second cluster head, selecting the cluster head in the proximity having a high signal strength with respect to the serving base station, and establishing a single hop connection with the second cluster head through one of an MTC device in the second cluster.

The method further includes fetching, by the MME, information on the primary cluster and the base station corresponding to the base station on receiving a paging information for a MTC device. The method includes transmitting the paging information only to the base station associated with the MTC device of the primary cluster. The method also includes scheduling a paging channel for the plurality of MTC devices associated with the second base station and sending the paging response through the dedicated connection established between the second cluster and the first base station by the MTC device. The method further includes reselecting, by the cluster head, a second base station base station when the cluster head moves from one cell to another cell. The method includes triggering, by the MTC device, a CH_update or TAU procedure with the MME. The method also includes updating the cluster database with information on the base station associated with the cluster head and initiating transmission of the paging information with the reselected base station.

The method further includes updating the cluster database, by the MME, when the cluster head moves from one base station to another base station in the tracking area and no cluster is available to join. The method includes using, by a core network, a paging slot of the cluster head to page the plurality of MTC devices in idle mode. The method also includes setting, by the core network, a periodic tracker area update timer and update timing such that the plurality of MTC devices associated with the cluster head performs a periodic tracker area update in a predefined time limit.

In a second example, a system to transmit paging messages to Machine Type Communication (MTC) devices in wireless communication is provided. The system includes a plurality of MTC devices in communication with a wireless network. The wireless network includes at least one first processor configured to receive a request from a plurality of MTC devices to transmit a signaling message. The signaling message includes a tracking area update (TAU) and paging information associated with the plurality of MTC devices. The at least one first processor is also configured to store information of the plurality of MTC devices associated with the first cluster head and base station corresponding to each of the MTC device. The at least one first processor is further configured to fetch information of the base station associated with a serving MTC device on receiving a data request from the at least one MTC device and transmit the paging information to the base station associated with the serving MTC device. The system further comprises at least one second processor configured to multicast the paging information to the plurality of MTC devices in a first cluster and obtain paging response from the plurality of MTC devices.

In an embodiment, the system further comprises at least one third processor configured to list the plurality of MTC devices in the proximity if one or more clusters have a dedicated connection with the base station. The plurality of MTC devices is one of a second cluster head or a plurality of MTC devices associated with the second cluster head. The at least one third processor is configured to select a second cluster head having a dedicated connection with a base station to transmit the signaling messages from the plurality of MTC devices if a first cluster does not have a dedicated connection with the first cluster head. The at least one third processor is also configured to establish a connection with the second cluster head, transmit information on a secondary cluster data signaling message to the MME, update the database for primary MTC devices and secondary MTC devices, and delete information on the plurality of secondary MTC devices from the cluster database when the primary cluster head establishes a dedicated connection with the base station. The primary MTC devices are associated with the registered cluster head. The secondary MTC devices are temporarily connected to the secondary cluster head.

The foregoing has outlined, in general, the various aspects of the disclosure and is to serve as an aid to better understanding the more complete detailed description which is to follow. In reference to such, there is to be a clear understanding that the present disclosure is not limited to the method or application of use described and illustrated herein. It is intended that any other advantages and objects of the present disclosure that become apparent or obvious from the detailed description or illustrations contained herein are within the scope of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
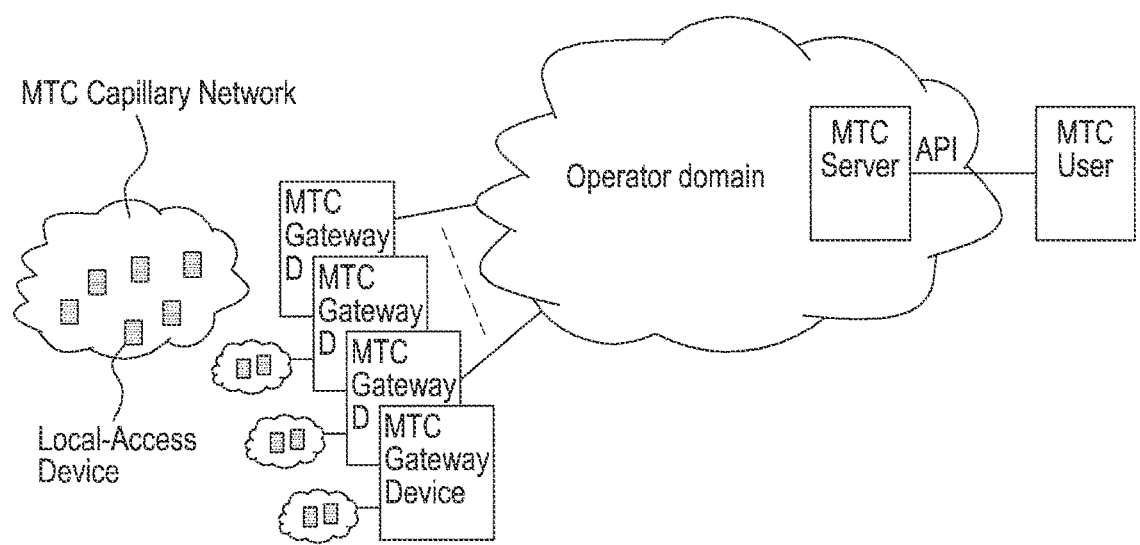
FIG. 1 is a high-level architecture of an example LTE system according to this disclosure.

Although specific features of the present disclosure are shown in some drawings and not in others. This is done for convenience only as each feature may be combined with any or all of the other features in accordance with the present disclosure.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be modified in various forms. Thus, the embodiments of the present disclosure are only provided to explain more clearly the present disclosure to the ordinarily skilled in the art of the present disclosure. In the accompanying drawings, like reference numerals are used to indicate like components.

Machine-to Machine (M2M)/Machine Type Communications (MTC) applications are applications where machines communicate with each other directly without human intervention. Examples of applications include smart metering, safety applications, health monitoring, fleet management, data applications and remote applications.

The MTC devices are embedded in cars, consumer electronic devices, vending devices, and the like. These devices are large in number and are wide spread. The applications communicate through widely deployed networks connecting the MTC devices to Internet forming Internet of Things (IoT). While some existing MTC deployments use short range communications, it would be ideal to use cellular networks as cellular network infrastructure is established in a stable manner and supports a large number of MTC devices.

The MTC servers which are generating traffic and trying to connect to several MTC devices at the same time leads to overload at backhaul traffic in Radio access network (RAN) and Core Network (CN). This causes intolerable paging delay, paging miss due to resource unavailability and spectrum inefficiency. At the MTC device, receiving the unnecessary paging such as paging for other users and processing the same will reduce the battery drain. Similarly overload occurs at the network side when the MTC servers initiate concurrent data transmission to several MTC devices. As the MTC servers are connected to the core network (MME/S-GW) and the core network is connected to the eNodeB or base station, the MTC servers attempts to reach the MTC devices to establish the connection and to send the data using the common channels (Paging channel). Since resources are limited in the common channel (Paging channel), eNodeB may not accommodate all the received paging messages in a given Paging Occasion, which in turn leads to paging delay or paging miss at the UE side. Similarly at the core network side, sending the paging to all the eNodeB irrespective of UE belongs to which eNodeB will cause overload at backhaul traffic.

In view of the foregoing, there is a need for a method and system for reducing the redundant paging transmitted from all base stations in the location area, where designated a UE is not available. There is also a need for a method and system for minimizing common paging resources at the base station, avoiding processing of other common channel paging messages by MTC device and minimizing the signaling for tracking area update procedure using D2D communication for MTC devices.

FIG. 1 is a high-level architecture of an example LTE system illustrating a working environment according to this disclosure. The MTC Gateway is a type of MTC device with 3GPP mobile communication capability. The MTC Gateway connects to the MTC Capillary network which contains local access devices using short range technologies for communication. The MTC Gateway device acts as a middle agent between the local access devices and the MTC Server. The MTC Server operates within the 3GPP network.

Figure 2:
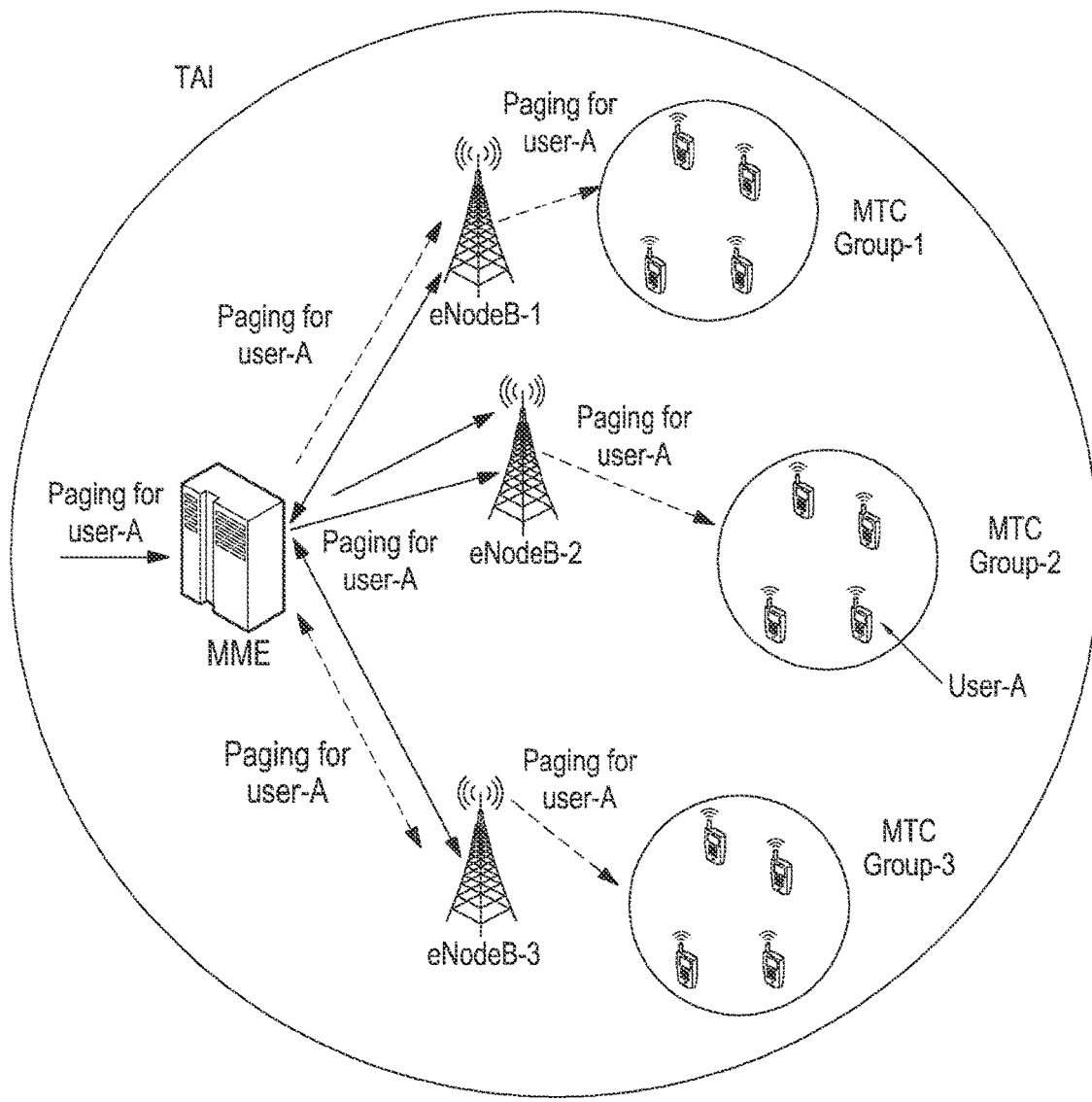
FIG. 2 is a network deployment of a scenario illustrating an example paging procedure of an MTC device according to this disclosure.

FIG. 2 is a network deployment of a scenario illustrating an example paging procedure of an MTC device according to this disclosure. In reference to FIG. 2, consider a scenario where user-A receives the paging message from the core network, for which, the MME broadcasts the same paging message for user-A to all eNodeBs under the tracking area. Further each eNodeB multicasts the same paging message on PDSCH (PCH) based on paging occasions to group of all the MTC devices having a same paging occasion. In this case, other eNodeBs, which all are in the same tracking area (except the eNodeB which user-A is camped on) are unnecessarily multicasting the same paging. This leads to wastage of resources at eNodeBs and additional power consumption at MTC devices to process the paging messages. This reduces the battery life, since paging messages received on the PDSCH (PCH channel) by MTC device need to be de-scrambled with P-RNTI and should go through the PDCCH blind decoding process and then compare with UE-ID, to find out, if the received paging is associated with the MTC device or not.

As shown in FIG. 2, the MME sends paging for User-A to the base stations/eNodeBs (such as eNb1, eNb2 and eNb3) which are in the same tracking area and each eNodeB sends the same paging message to corresponding group of UEs which can be scheduled for this paging occasion, paging group-1, paging group-2 and paging group-3 as shown in FIG. 2. Here, since User-A belongs to paging group-2, devices that belong to other cluster are also receiving the same paging and the processing of the paging causes additional power consumption at the UE. For the devices in other cluster, paging message sent by the MME leads to wastage of spectrum at an eNodeB due to unwanted paging and delay in paging messages. If multiple paging messages are piled up at an eNodeB, then the eNodeB might also have a delay in processing.

Figure 3:
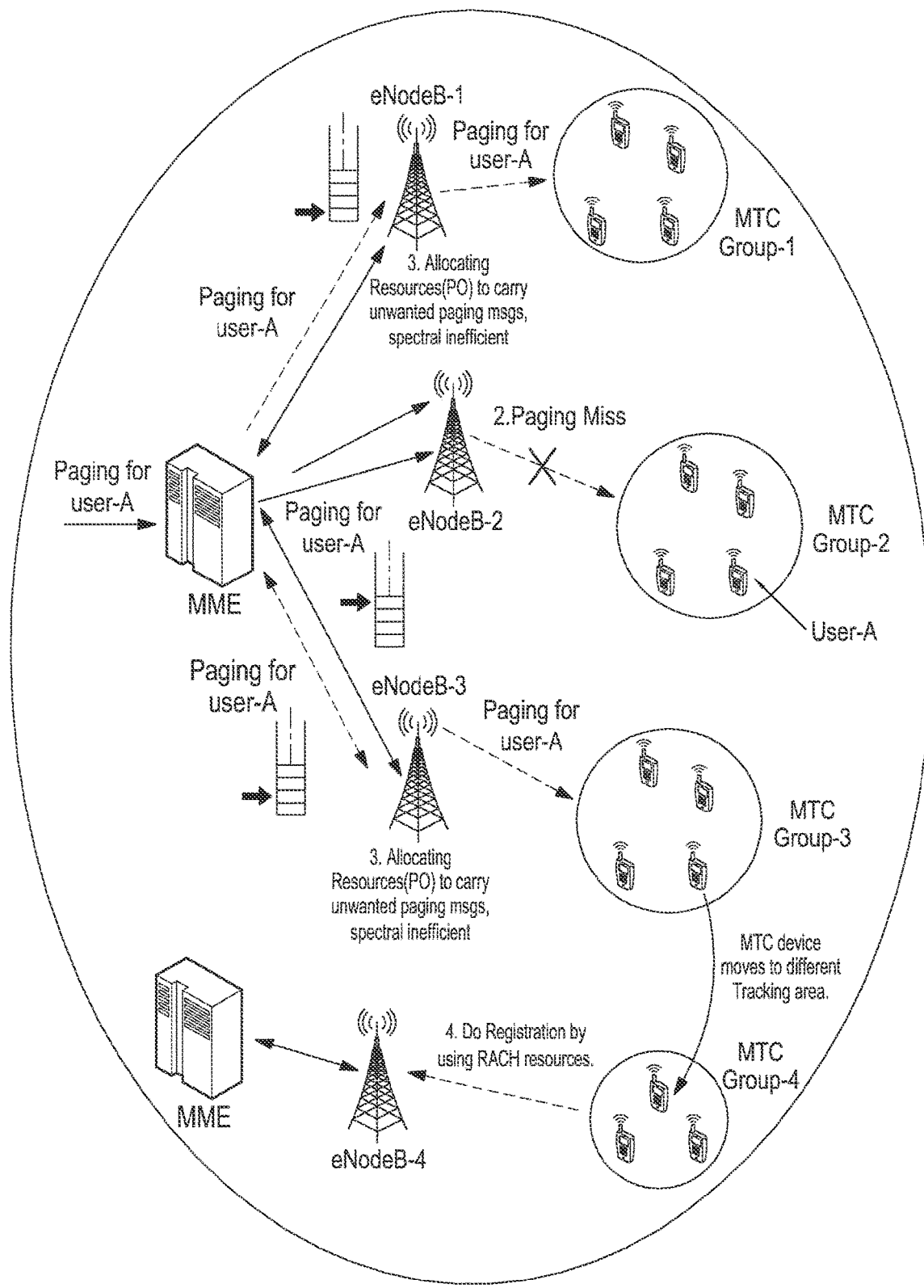
FIG. 3 is a network deployment of a scenario illustrating an example paging procedure of an MTC device according to this disclosure.

FIG. 3 is a network deployment of a scenario illustrating an example paging procedure of an MTC device according to this disclosure. As shown in FIG. 3, MME is sending User-A paging message to all the base stations/eNodeBs in the same tracking area. In this case, the eNodeB-2 is overloaded with many paging messages in the queue to be sent on the same paging occasions, whereas eNodeB-1 and eNodeB-3 are having no paging message to be sent on the same paging occasion. Since paging overload happens on eNodeB-2, it takes several seconds for eNodeB to reconfigure the paging channel. After reconfiguration, it takes more time to accept the congestion. Therefore, it is possible that eNodeB would not be able to page an MTC device in time before it goes back to sleep. Sometime this delay would be minutes and which make MTC device to miss the paging.

Also, as User-A is in MTC Group-2 and it belongs to eNodeB-2, other eNodeBs (eNB-1 and eNB-3) are wasting the paging channel resources by sending the User-A paging messages as shown in FIG. 3. Moreover, when the MTC device moves from one tracking area to another such as an MTC device moving from MTC group-1 or MTC group-3 to MTC group-4 and MTC group-4 belongs to different eNodeB-4 and different MME. Here MTC device uses the RACH resources for initial access and does the registration.

Figure 4:
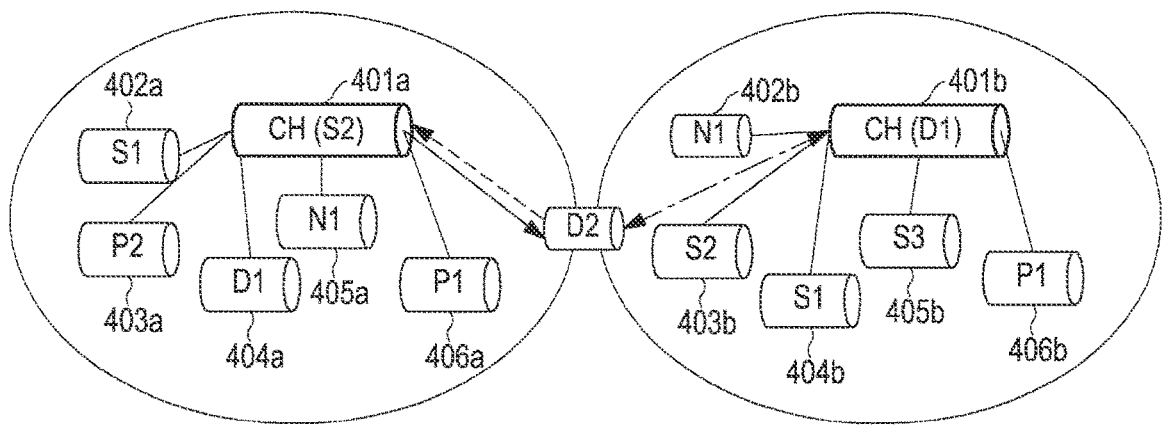
FIG. 4 is an illustration of an example design for deployment of MTC devices according to this disclosure.

FIG. 4 is an illustration of an example design for deployment of MTC devices according to this disclosure. The FIG. 4 illustrates a process of selecting a cluster head from a group of MTC devices within a cluster. The MTC devices are organized as clusters where each cluster includes a cluster head (CH) 401a and a plurality of cluster members (CM). As shown in FIG. 4, the plurality of cluster members includes a safety application device (S) 402a, a periodic application device (P) 403a and 406a, a non-periodic application device (N) 405a, and a data application device (D) 404b. The MTC devices are organized as clusters where each cluster includes a cluster head (CH) 401b and plurality of cluster members (CM). As shown in FIG. 4, the plurality of cluster members includes a non-periodic application device (N) 402b, safety application devices (S) 403b, 404b, and 405b, and a periodic application device (P) 406b. The cluster head is configured to directly communicate with the network and the plurality of cluster members will communicate to the network through the cluster head. The cluster members are also capable of communicating with the network for working under different specific scenarios.

Figure 5:
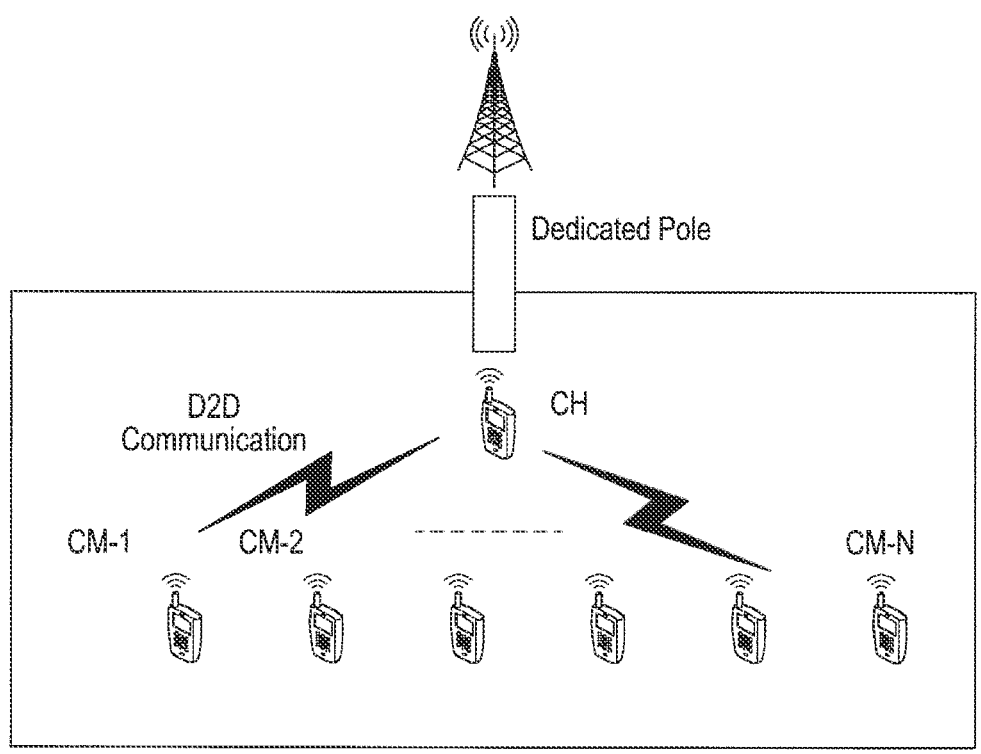
FIG. 5 is an illustration of an example design for deployment of MTC devices according to this disclosure.

FIG. 5 is an illustration of an example design for deployment of MTC devices according to this disclosure. In accordance with FIG. 5, a plurality of MTC devices 402a-402d form a cluster and select a cluster head 401, where the cluster head 401 is connected to a base station (eNodeB) 501 using a dedicated connection. The cluster head 401 establishes and releases the dedicated connection to the base station 501 based on the traffic pattern of the MTC devices. This in turn minimizes the RACH access for RRC connection for each and every MTC device and reduces the latency to access the base station.

Figure 6:
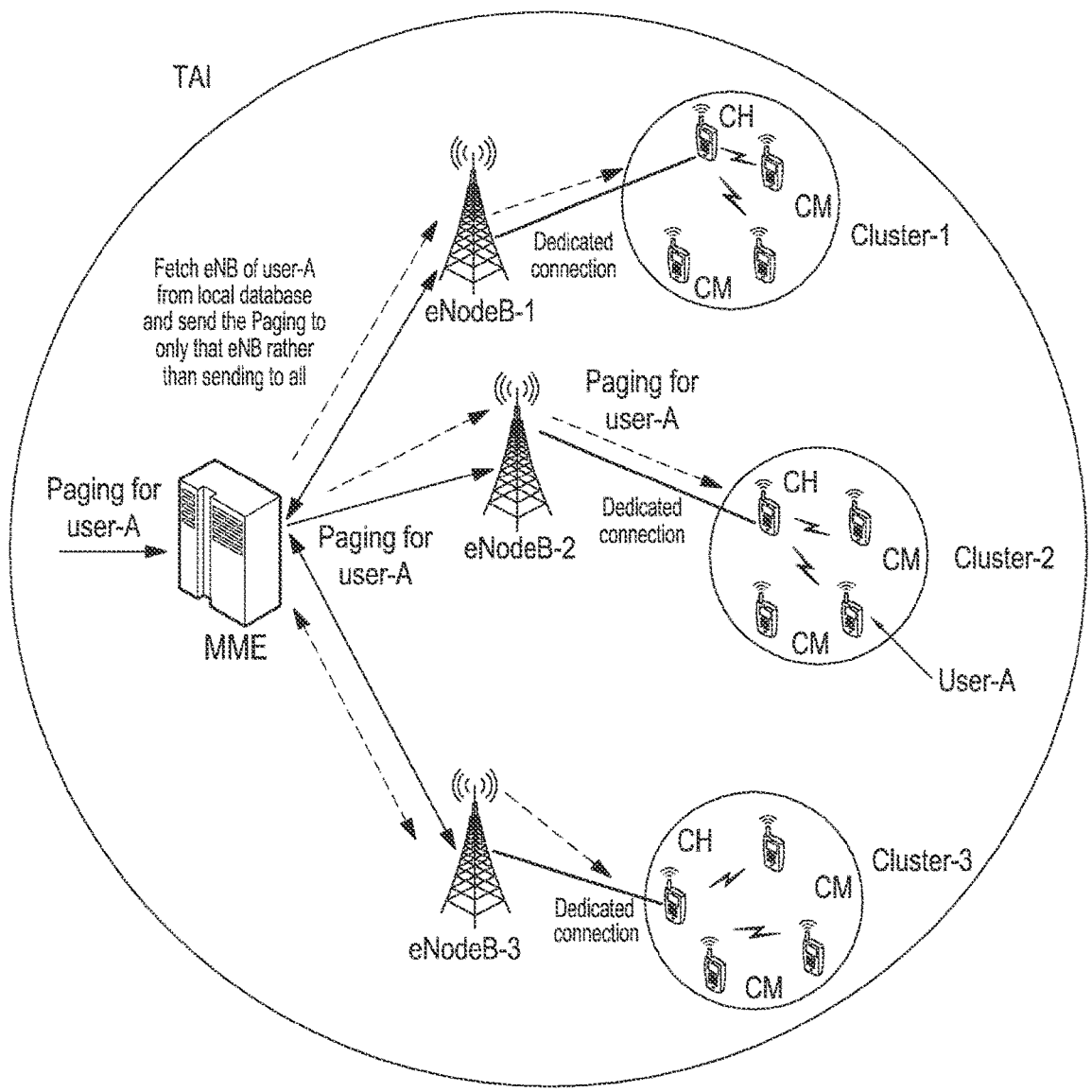
FIG. 6 is a diagram illustrating an example method of transmitting paging messages to MTC devices according to this disclosure.

FIG. 6 is a diagram illustrating an example method of transmitting paging messages to MTC devices according to this disclosure. The MTC cluster head has a dedicated radio connection with the base station as shown in FIG. 6. The plurality of cluster members in the cluster requests the cluster head to transmit the messages. The signaling messages such as the tracking area update (TAU) and paging of the cluster members are transmitted through the cluster head. This helps to avoid inefficient RACH signaling in the uplink and minimize the monitoring of paging slots by the number of MTC devices in downlink. Here the clustering mechanism is only applicable when the cluster head has more than a pre-set number of MTC devices.

The cluster head informs the Mobility Management Entity (MME) through the base station about the plurality of MTC devices. The MME stores the information along with the base station in a local database called as cluster database (cluster DB). When the MME receives a data request from a cluster member/MTC device, the MME fetches the relevant base station and sends the paging message only to the base station serving the MTC device rather than sending to all the base stations in the tracking area.

As shown in the FIG. 6, the plurality of MTC devices use the channel head dedicated connection to carry the signaling messages such as tracking area update (TAU) during registration. The MME stores the cluster members and cluster head along with their base stations in a cluster database (ClusterDB) for further communication. The ClusterDB is maintained by the MM E, where the MME stores the list of MTC devices associated with a cluster head and information regarding their corresponding base station for future communication.

Figure 7:
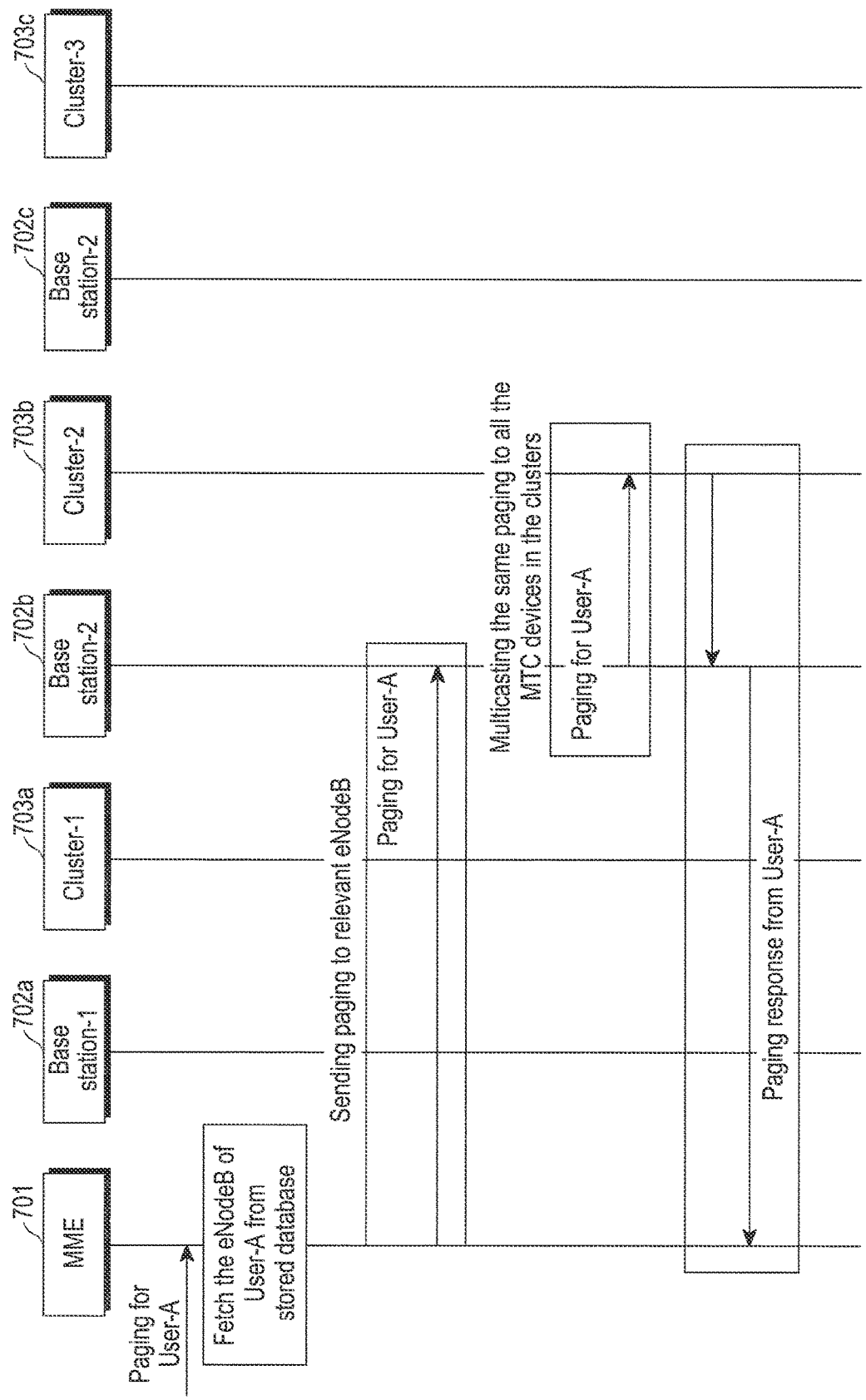
FIG. 7 is an example MSC diagram for a cluster head with a dedicated connection for TAU and paging according to this disclosure.

FIG. 7 is an example MSC diagram for a cluster head with a dedicated connection for TAU and paging according to this disclosure. The MME 701 gets paging for a first user, say User-A. MME 701 fetches the details of the relevant base station (eNodeB) 702a from the clusterDB and sends paging information only to the serving base station 702a rather than sending to all the base stations (such as 702b, or 702c). The base station 702a then multicasts the same paging to the plurality of MTC devices in the clusters (such as 703a, 703b, 703c). Further the paging response from User-A is transmitted back to the MME. The embodiments as discussed herein effectively utilize the radio resources in the other base stations. This avoids processing the User-A paging message in other clusters such as cluster-1 703a and cluster-3 703c.

Figure 8:
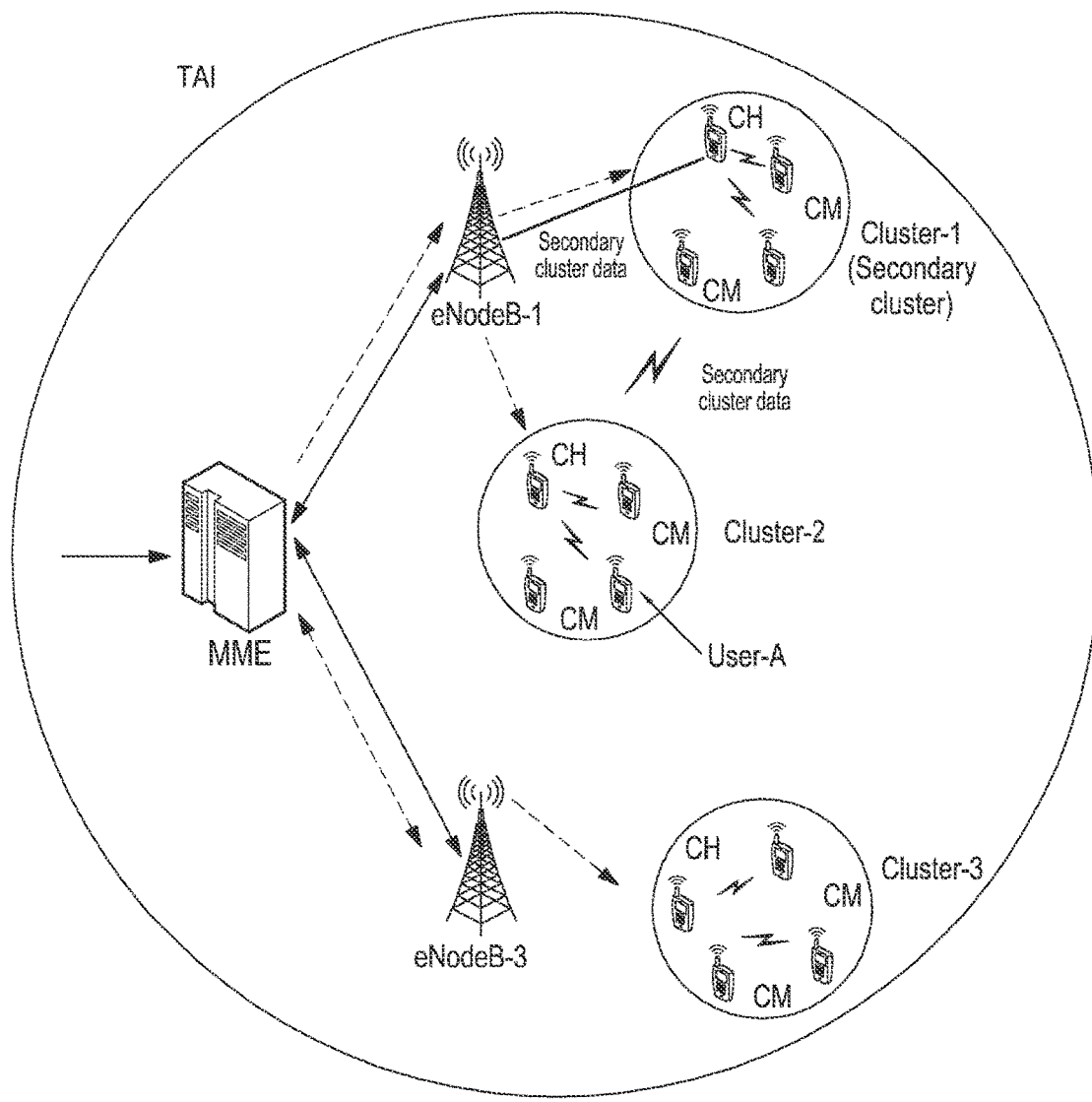
FIG. 8 is a diagram illustrating an example method of transmitting paging messages to MTC devices according to this disclosure.

FIG. 8 is a diagram illustrating an example method of transmitting paging messages to MTC devices according to this disclosure. As illustrated in FIG. 8, the MTC cluster head does not have a dedicated radio connection with the base station. The MTC device then searches for a neighbor cluster head, such as a second cluster head which has a dedicated connection with the network through a D2 D communication in the same tracking area to carry the cluster member signaling messages such as TAU, CH_Update and CM_Update.

As shown in FIG. 8, a new user 'User-A' enters into cluster-2. However, the corresponding cluster head (CH) does not have a dedicated connection with the network. The CH of cluster-2 (CH-2) searches for the neighbor CH which has a dedicated connection with the network. Here, CH of cluster-1 (CH-1) has a dedication connection, and CH-2 informs CH-1 about secondary MTC device type by sending the new message "Secondary Cluster Data". Here the secondary MT device can be either cluster head or cluster members/MTC devices which does not have any dedicated connection to base station, but has identified at least one neighbor MTC device (CH/CM) which has a dedicated connection to network and carrying the payload.

In such a case, the MTC device lists the devices in the proximity in case of more number of clusters which has dedicated connection to network, which can be cluster head, or can be MTC devices belongs to neighbor cluster head.

The MTC device also requests for the serving signal strength (CINR/RSRQ) to the neighbor cluster head with respect to the serving eNodeB, or chooses the neighbor cluster head which has best signal strength (CINR/RSRQ) with respect to their serving base station. Further the MTC device informs the serving cluster head about moving to chosen cluster either by a single hop connection or direct connection to the cluster head as secondary MTC device.

In an embodiment, the CH-2 transmits the secondary cluster data signaling message to the MME using the dedicated connection. Here CH-1 may or may not come under the same base station. The MME will update the cluster database for the plurality of primary and secondary MTC devices for paging. The primary MTC devices are associated with the registered cluster and the secondary MTC devices would be temporarily connected to CH-2. The secondary MTC devices will be deleted from the cluster database once CH-1 establishes the dedicated connection with the base station.

Figure 9:
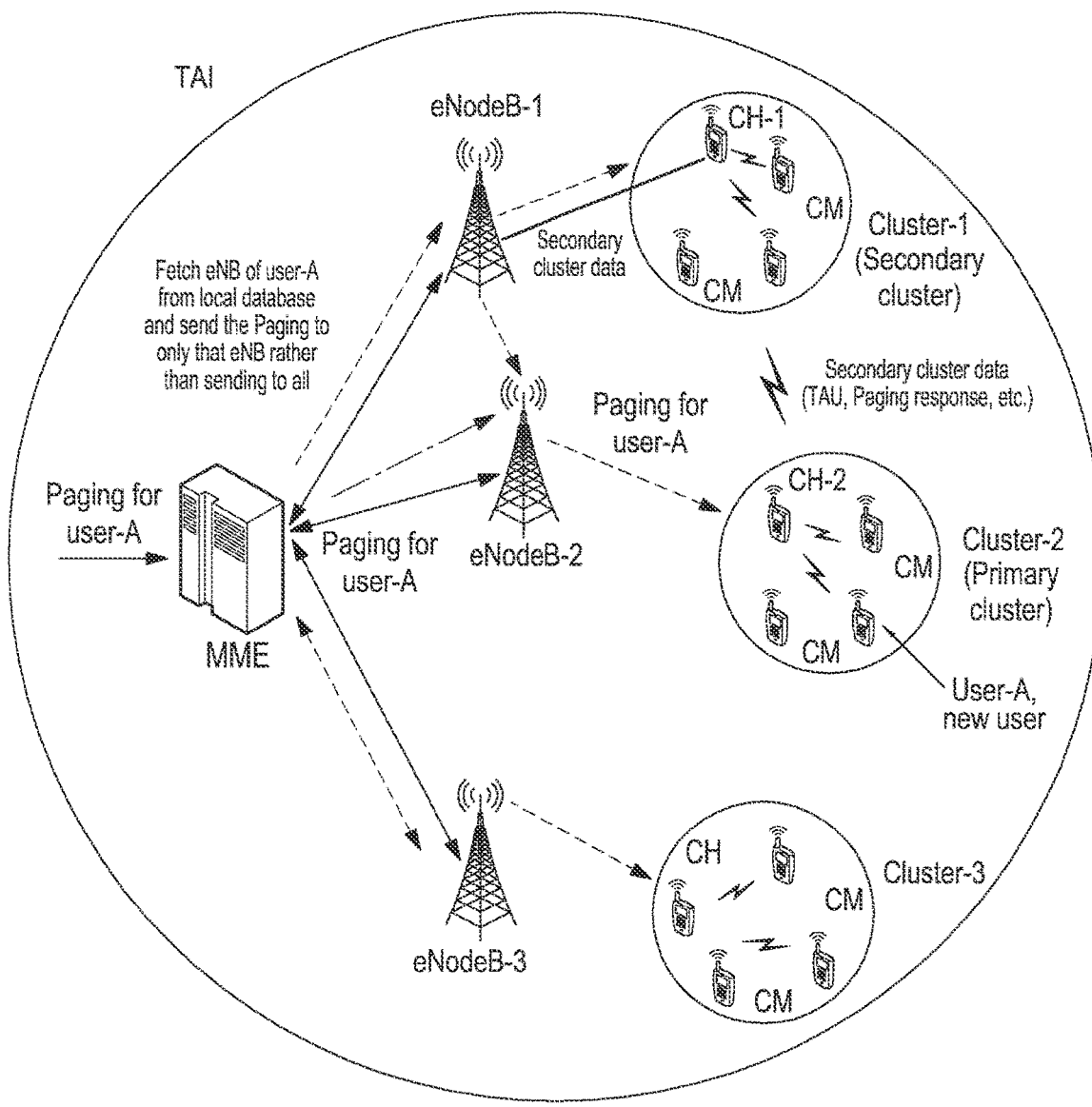
FIG. 9 is a diagram illustrating an example method of transmitting paging messages to MTC devices according to this disclosure.

FIG. 9 is a diagram illustrating an example method of transmitting paging messages to MTC devices according to this disclosure. According to FIG. 9, the user A is registered with the base station through a second cluster (Cluster-1) which belongs to a different base station. When MME receives the paging for User-A, MME fetches the primary cluster information and the corresponding base station details of the cluster members. For example, the MME sends paging only to base station-2 and it will schedule in the PDSCH (PCH) for all MTC devices under the base station-2.

After receiving paging, since secondary cluster has dedicated connection, the serving cluster (primary cluster) makes use of the dedicated connection and sends the paging response through the secondary cluster and eNodeB-1. This in turn reduces the chance to establish the connection once again with primary cluster and RACH resource utilization.

Figure 10:
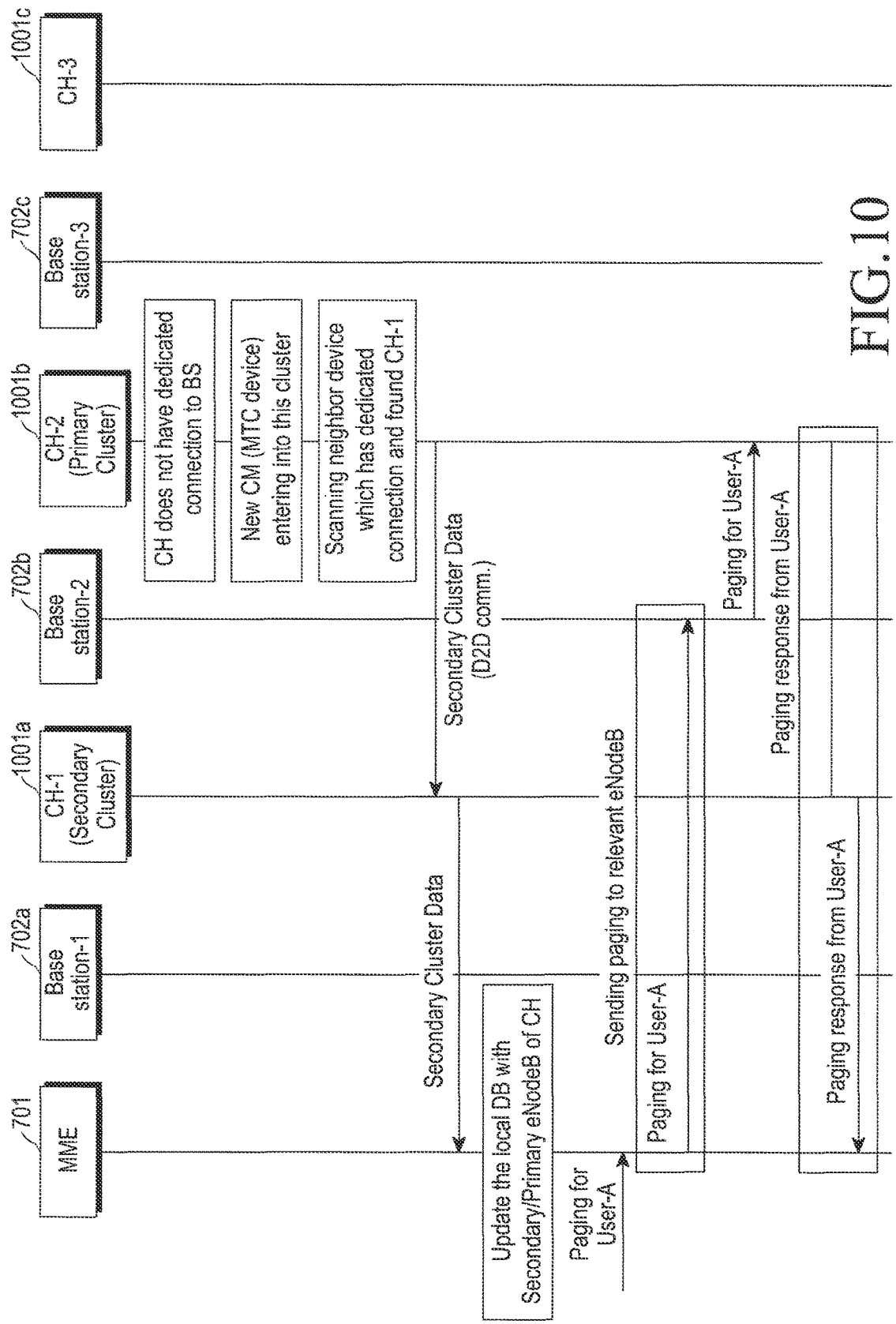
FIG. 10 is an example MSC diagram for a neighboring cluster head with a dedicated connection for TAU and paging according to this disclosure.

FIG. 10 is an example MSC diagram for a neighboring cluster head with a dedicated connection for TAU and paging according to this disclosure. The cluster head (CH) 1001b of the primary cluster does not have a dedicated connection to the base station 702a. When a new cluster member or MTC device enters into the primary cluster and searches for the neighbor MTC device which has a dedicated connection with the base station. Here, CH of cluster-1 (CH-1) 1001a has a dedication connection, and CH-2 1001b (or CH-3 1001c) informs to CH-1 1001 about secondary MTC device type by sending the new message "Secondary Cluster Data" over a D2D communication. The secondary cluster data is then transmitted to the MME 701. The MME 701 updates the clusterDB with the primary or secondary base stations 702b and 702c of the cluster head.

When MME 701, gets a paging for user-A, the MME 702 fetches the primary cluster information and the corresponding base station details from the cluster database. Thus, the MME 701 sends paging only to the second base station 702b and schedules in the PDSCH (PCH) for all MTC devices under the second base station 702b. Here the user-A is registered through a secondary cluster (cluster-1) which belongs to different base stations. After receiving paging, since secondary cluster has dedicated connection, the serving cluster (primary cluster) uses the dedicated connection and sends the paging response through the secondary cluster and first base station 702. This reduces the need for establishing the connection once again with primary cluster and RACH resource utilization.

In an embodiment, during mobility, when the CH moves from one cell to another cell (cell reselection) in the same tracking area, CH has to do the CH_Update procedure or TA update procedure to update to the MME. Here, CH_Update is similar to the cell Update in UMTS technology where MTC device uses minimal signaling messages to intimate to MME to update their local data base saying like CH has moved from one cell to another cell. This is specially targeted for low mobility cluster head, Since MTC devices are largely, and assumed to be either low mobility or stationary.

Figure 11:
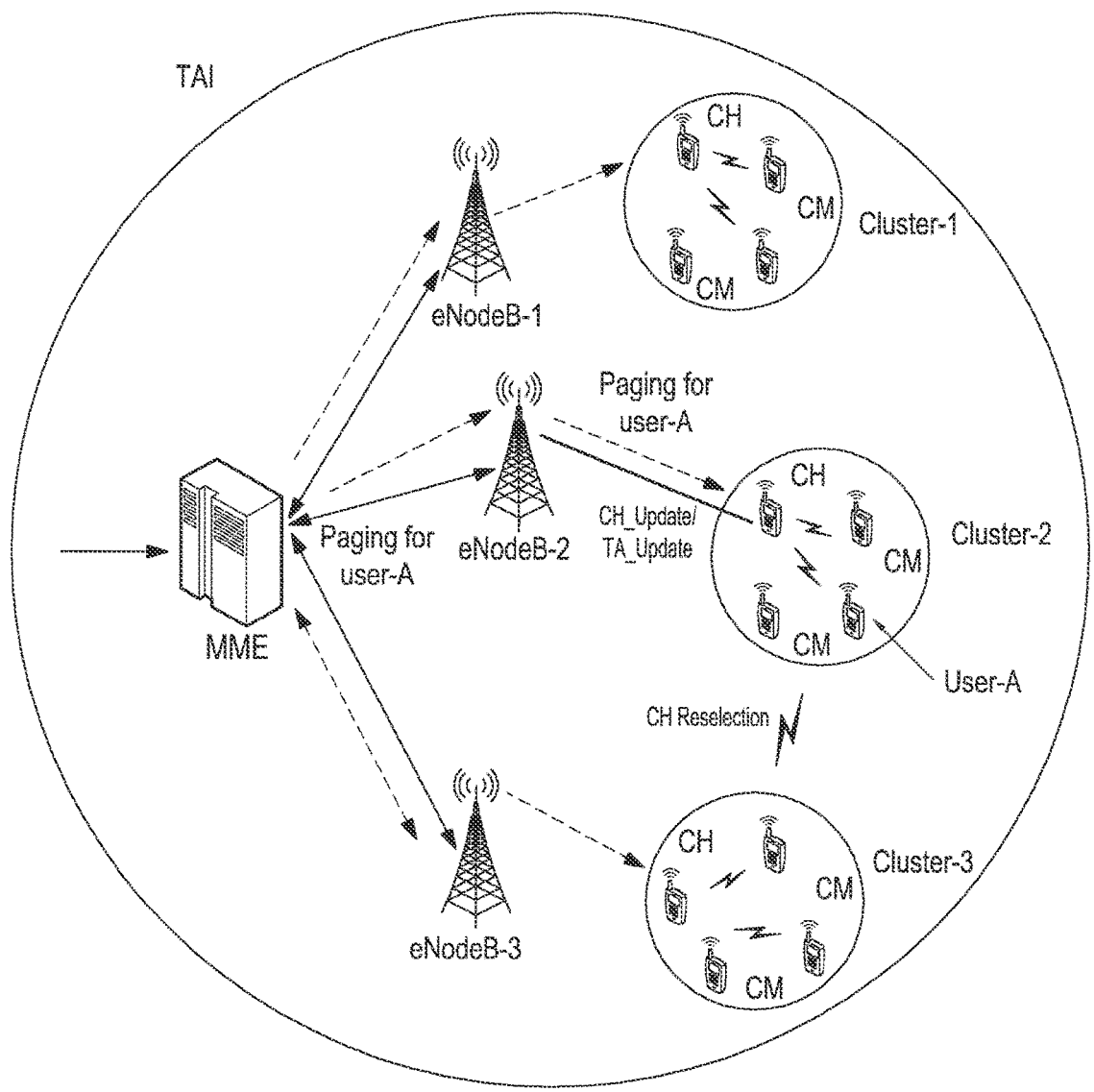
FIG. 11 is a diagram illustrating an example method of reselecting a cluster head cell and updating an MME according to this disclosure.

FIG. 11 is a diagram illustrating an example method of reselecting a cluster head cell and updating an MME according to this disclosure. The cluster head of cluster-3 is moving from the base station-3 to cluster-2 which belongs to the second base station, base station-2. After CH reselection, the MTC device triggers the CH_Update or TA_Update procedure for which MME updates the cluster database for further communication to that MTC device through basestation-2.

Figure 12:
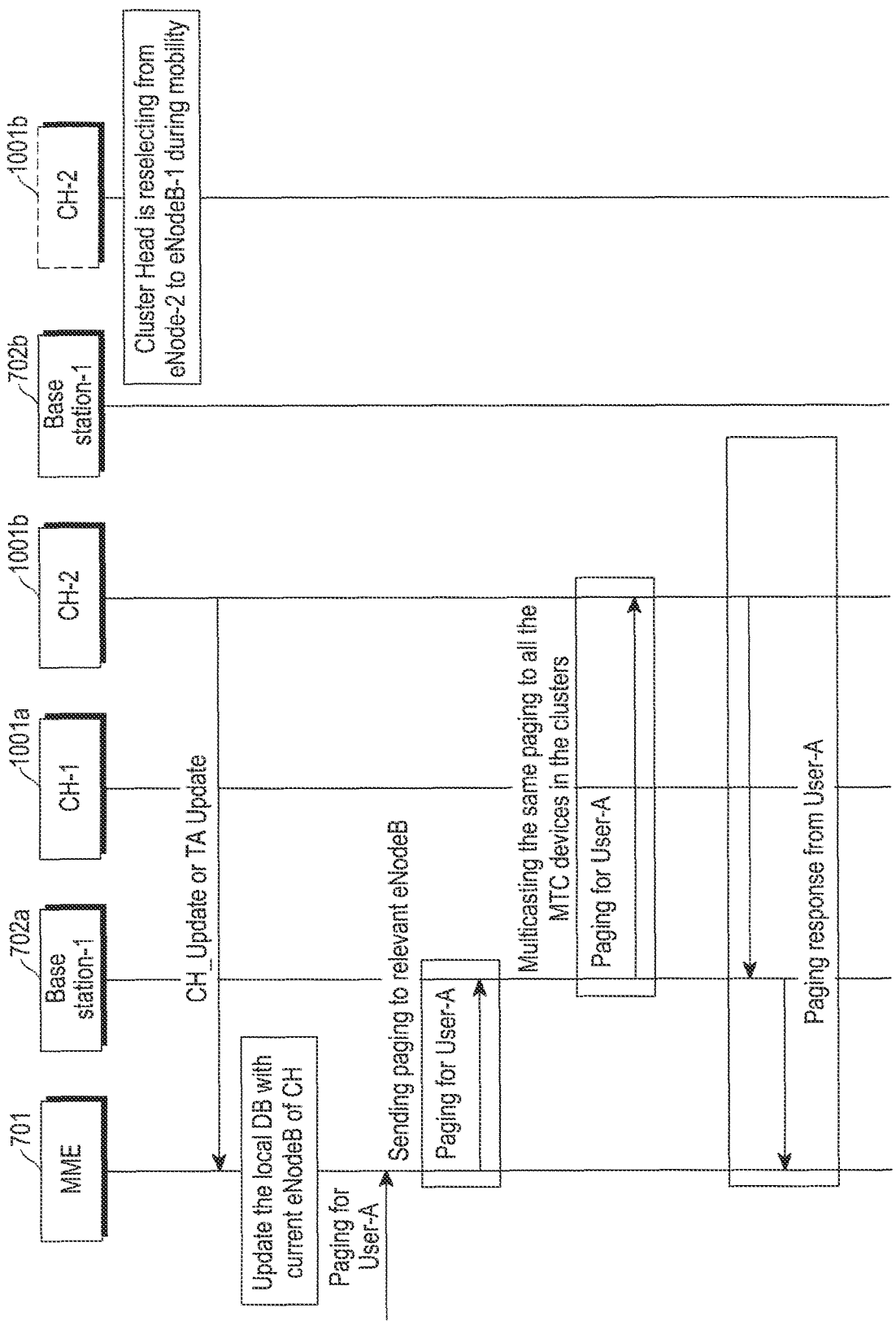
FIG. 12 is an example MSC diagram for a cluster head reselection and updating an MME according to this disclosure.

FIG. 12 is an example MSC diagram for a cluster head reselection and updating an MME according to this disclosure. The cluster head of cluster-2 is reselecting from second base station to first base station during mobility. The second channel head then sends a CH_update or TA update message to the MME. The MME updates the clusterDB with current base station of the cluster head. When MME 601, gets a paging for user-A, MME fetches the primary cluster information and their corresponding base station details from the cluster database. The MME then sends the paging only to the relevant base station. The base station further multicasts the same paging message to all the MTC devices in the clusters.

Figure 13:
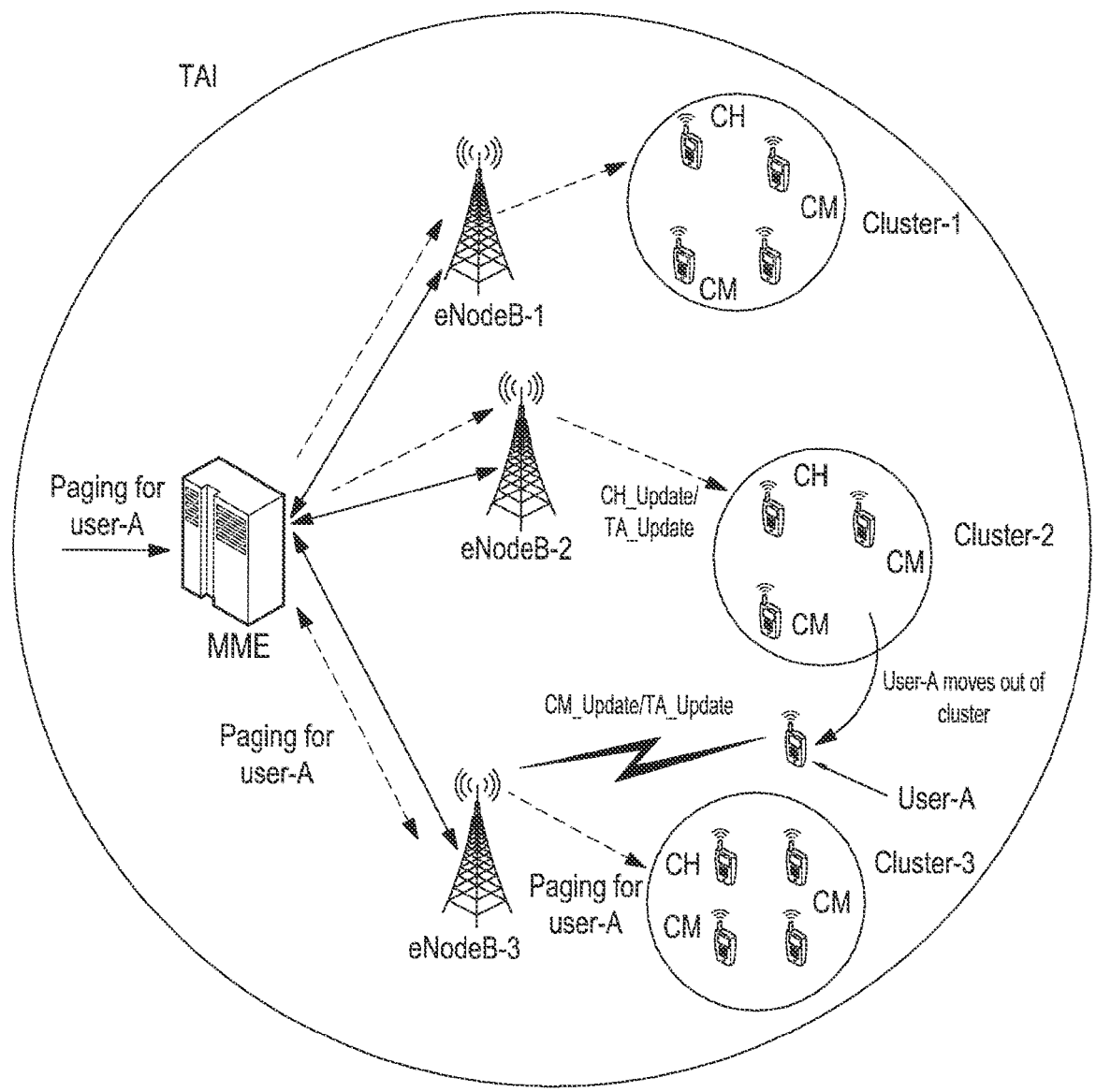
FIG. 13 is a diagram illustrating an example method of transmitting paging messages to MTC devices when the cluster member moves out of cluster and updating an MME according to this disclosure.

FIG. 13 is a diagram illustrating an example method of transmitting paging messages to MTC devices when the cluster member moves out of cluster and updating an MME 701 according to this disclosure. In mobility, when the MTC member moves out of the cluster and not able to join in any of the clusters, then the MTC device has to initiate a CM_Update procedure (New signaling message) or TA update procedure to update to the MME (existing method) for which paging procedure falls back to old paging mechanism (sending to whole TA rather than specific BS). Here, CM_update is similar to the cell_update in UMTS technology where MTC device uses minimal signaling messages to intimate to MME to update the cluster database by saying like CM has moved from one cell to another cell.

Figure 14:
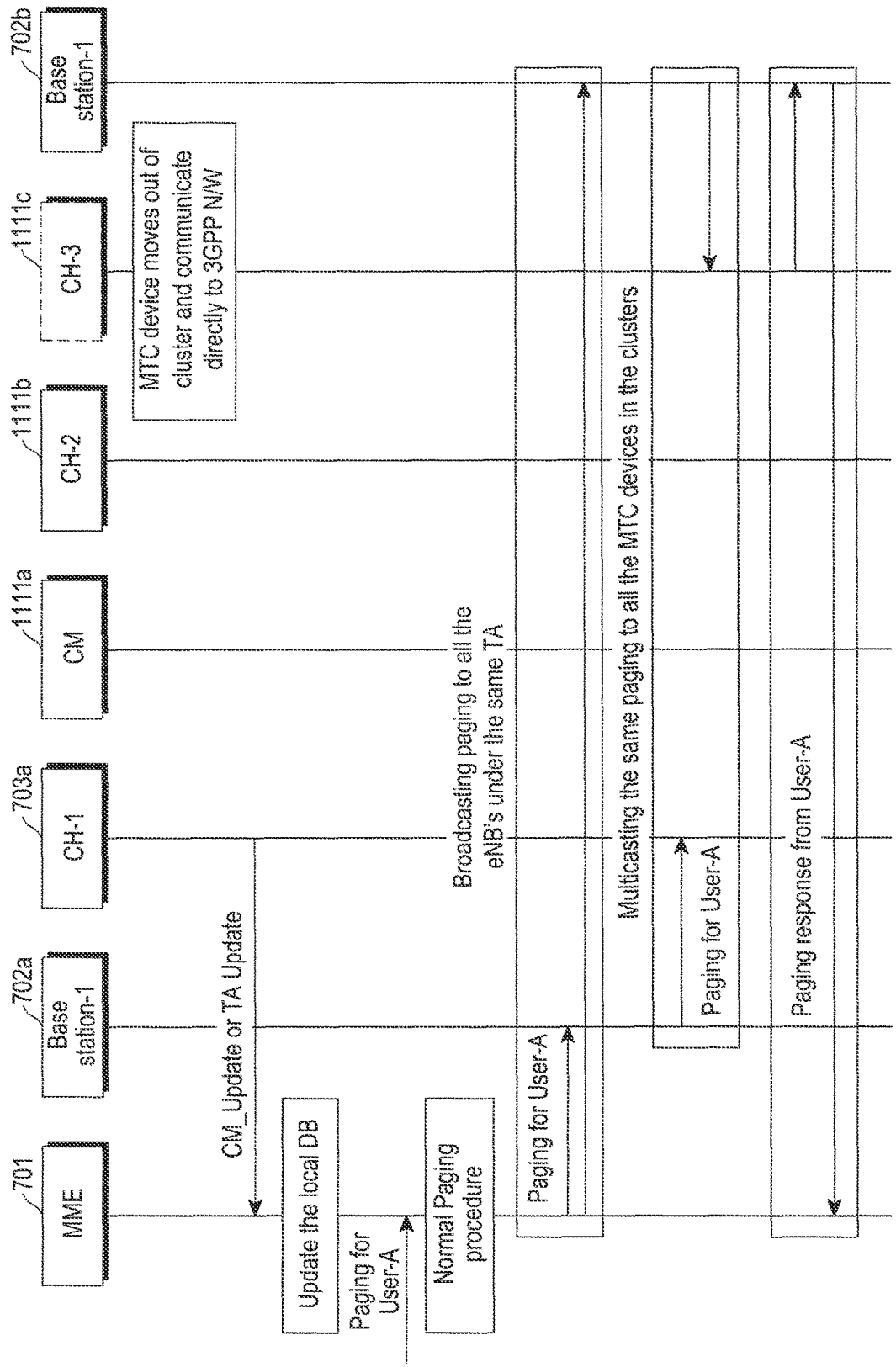
FIG. 14 is an example MSC diagram illustrating an example method when a Cluster Member (CM) moves out of cluster and an MME is updated according to this disclosure.

FIG. 14 is an example MSC diagram illustrating an example method when a Cluster Member (CM) 1111a moves out of cluster and an MME is updated according to this disclosure. When the User-A moves out from the cluster-2 and moving to the different eNodeB-3 from eNode-2 in the same tracking area, and does not find any cluster to join, in that case User-A directly communicates with the 3GPP network by sending the CM_Update/TA_Update so that MME updates its database for further communication to that MTC device through base station-3 on the PO. At the same time cluster head of cluster-2 triggers the CH_Update to MME which in turn updates the cluster members of cluster-2 in MME data base for further communication.

In an embodiment, the core network uses the paging slot of channel head to page the cluster member or a plurality of MTC devices in idle mode. The cluster head then reads the paging message and passes it onto corresponding cluster member based on local database. For periodic TA update, the core network sets the periodic TA update timer and update timing such that all MTC devices under a channel head will do the periodic TA update in a predefined time limit. This will help to reduce the load on uplink for TA updates. The channel head only will do the periodic TA update rather than doing all the MTC devices in a cluster.

The embodiments of the present disclosure provide for minimizing the power consumption of UE, reducing the load on the paging resources, and reducing the delay at base station processing. The embodiments herein enable the sending of the paging messages from MME to relevant base station serving the MTC device rather than to all the base stations in the same tracking area to reduce the overload at core/radio access network and interfaces. If the CH (such as CH-2 1111*b* or CH-3 1111*c*) had a dedicated connection, then the registration can be done through CH either individual or group of MTC devices when it requires (cell reselection) without using the RACH resources. Further if the CH has a dedicated connection, then a dedicated paging type can be used for other cluster network mentioned in the above steps such as for or with GSM, UMTS.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to transmit a signaling messages from a Mobility Management Entity (MME) to Machine Type Communication (MTC) devices in a wireless communication system, the method comprising:
   storing, in a database, information of a plurality of MTC devices included in a first cluster and a first base station corresponding to the plurality of the MTC device;
   receiving a secondary cluster data signaling message from a first cluster head of the first cluster;
   identifying a dedicated connection established between the first cluster head and a second cluster head based on the secondary cluster data signaling message, wherein the second cluster head is located near the first cluster and has a dedicated connection with a second base station corresponding to a plurality of MTC devices included in a second cluster; and
   updating the database for primary MTC devices and secondary MTC devices, wherein the primary MTC devices are associated with a registered cluster and the secondary MTC devices are temporarily connected to the second cluster head.

2. The method of claim 1, further comprising:
   receiving a first request to transmit the signaling message to at least one of the plurality of MTC devices included in the first cluster, wherein the signaling message comprises a tracking area update (TAU) and a paging information associated with the at least one of the plurality of MTC devices included in the first cluster;
   fetching information, from the database, of a base station connected with the first cluster head in response to receiving the first request; and
   transmitting the signaling message to the at least one of the plurality of MTC devices included in the first cluster, through the base station connected with the first cluster head, based on the fetched information.

3. The method of claim 2, further comprising:
   obtaining a first paging response, corresponding to the signaling message, from the at least one of the plurality of MTC devices included in the first cluster.

4. The method of claim 1, further comprising:
   acquiring a list of the plurality of MTC devices included in the second cluster, wherein one of the plurality of MTC devices included in the second cluster is the second cluster head or is associated with the second cluster head; and
   storing the list, in the database, of the plurality of MTC devices included in the second cluster and information of the second base station corresponding to the plurality of MTC devices included in the second cluster.

5. The method of claim 1, further comprising:
   deleting information of the secondary MTC devices from the database when the first cluster head establishes the dedicated connection with the second base station.

6. The method of claim 1, wherein the secondary cluster data signaling message comprises information of a first MTC device, wherein the first MTC device is one of a Cluster Head or a Cluster Member that does not have a dedicated connection with a base station and the first MTC device identifies at least one neighbor MTC device that has a dedicated connection with a base station.

7. The method of claim 1, further comprising:
   when the first cluster head moves from the first cluster to another cluster, update the database with information of a base station associated with the another cluster.

8. A system to transmit a signaling message to Machine Type Communication (MTC) devices in a wireless communication, the system comprising:
   a plurality of MTC devices associated with a first cluster head in communication with a wireless network, wherein the wireless network comprises at a first processor configured to:
      store information of the plurality of MTC devices and a first base station corresponding to the plurality of MTC devices;
      receive a request to transmit the signaling message, wherein the signaling message comprises a tracking area update (TAU) and a paging information associated with the plurality of MTC devices;
      fetch information of the first base station in response to receiving a first request; and transmit the signaling message to the first base station based on the fetched information;

if one or more clusters located near a first cluster associated with the first cluster head, establish a dedicated connection with one or more base station respectively, list, by the first cluster head, a plurality of MTC devices included in the one or more clusters; and when the first cluster head does not have a dedicated connection with the first base station, select, by the first cluster head, a second cluster head among the plurality of MTC devices included in the one or more clusters, to transmit a first paging response.

9. A Mobility Management Entity (MME) transmitting a signaling message to Machine Type Communication (MTC) device in wireless communication, the MME comprising:
a processor configured to:
store information, in a database, of a plurality of MTC devices included in a first cluster and a first base station corresponding to the plurality of MTC devices included in the first cluster;
receive a secondary cluster data signaling message from a first cluster head of the first cluster;
identify a dedicated connection established between the first cluster head and a second cluster head based on the secondary cluster data signaling message, wherein the second cluster head is located near the first cluster and has a dedicated connection with a second base station corresponding to a plurality of MTC devices included in a second cluster; and
update the database for primary MTC devices and secondary MTC devices, wherein the primary MTC devices are associated with a registered cluster and the secondary MTC devices are temporarily connected to the second cluster head.

10. The MME of claim 9, wherein the processor is further configured to:
receive a first request to transmit the signaling message to at least one of the plurality of MTC devices included in the first cluster, wherein the signaling message comprises a tracking area update (TAU) and a paging information associated with the at least one of the plurality of MTC devices included in the first cluster;
fetch information, from the database, of a base station connected with the first cluster head in response to receiving the first request; and
transmit the signaling message to the at least one of the plurality of MTC devices included in the first cluster, through the base station connected with the first cluster head, based on the fetched information.

11. The MME of claim 10, wherein the processor is further configured to:
obtain a first paging response, corresponding to the signaling message, from the at least one of the plurality of MTC devices included in the first cluster.

12. The MME of claim 9, wherein the processor is further configured to:
acquire a list of the plurality of MTC devices included in the second cluster, wherein one of the plurality of MTC devices included in the second cluster is the second cluster head or is associated with the second cluster head; and
store the list, in the database, of the plurality of MTC devices included in the second cluster and information of the second base station corresponding to the plurality of MTC devices included in the second cluster.

13. The MME of claim 9, wherein the processor is further configured to:
delete information of the secondary MTC devices from the database when the first cluster head establishes the dedicated connection with the second base station.

14. The MME of claim 9, wherein the secondary cluster data signaling message comprises information of a first MTC device, wherein the first MTC device is one of a Cluster Head or a Cluster Member that does not have a dedicated connection with a base station and the first MTC device identifies at least one neighbor MTC device that has a dedicated connection with a base station.

15. The MME of claim 9, wherein the processor is further configured to:
when the first cluster head moves from the first cluster to another cluster, update the database with information of a base station associated with the another cluster.

16. A cluster head for communicating with a Machine Type Communication (MTC) device in wireless communication, the cluster head comprising:
a processor configured to:
identify a plurality of MTC devices included in a first cluster associated with the cluster head;
establish a dedicated connection with a first base station;
receive a signaling message from the first base station, wherein the signaling message comprises a tracking area update (TAU) and a paging information associated with at least one of the plurality of MTC devices included in the first cluster;
transmit the signaling message to the at least one of the plurality of MTC devices included in the first cluster; and
obtain a first paging response, corresponding to the signaling message, from the at least one of the plurality of MTC devices included in the first cluster.

17. The cluster head of claim 16, wherein the processor is further configured to:
transmit the first paging response to a Mobility Management Entity (MME) through the first base station.

18. The cluster head of claim 16, wherein the processor is further configured to:
if one or more clusters, located near the first cluster, have a dedicated connection with one or more base station respectively, list a plurality of MTC devices included in the one or more clusters;
when the cluster head does not have a dedicated connection with the first base station, select a second cluster head among the plurality of MTC devices included in the one or more clusters, to transmit the first paging response;
establish a connection with the second cluster head; and
transmit information of a secondary cluster data signaling message to a Mobility Management Entity (MME) through a second base station associated with the second cluster head.

19. The cluster head of claim 18, wherein the processor is further configured to:
transmit the first paging response to a Mobility Management Entity (MME) through the second base station.

20. The cluster head of claim 18, wherein the secondary cluster data signaling message comprises information of a first MTC device, wherein the first MTC device is one of a Cluster Head or a Cluster Member that does not have a dedicated connection with a base station and the first MTC device identifies at least one neighbor MTC device that has a dedicated connection with a base station.

* * * * *